United States Patent
Borge

(10) Patent No.: US 8,636,588 B2
(45) Date of Patent: Jan. 28, 2014

(54) INTERACTIVE ACTION FIGURES FOR GAMING SYSTEMS

(75) Inventor: Michael D. Borge, New Plymouth, ID (US)

(73) Assignee: Ganz, Woodbridge, Ontario ( * ) Notice: Subject to any disclaimer, the term of this patent is extended or adjusted under 35 U.S.C. 154(b) by 1239 days.

(21) Appl. No.: 12/257,496

(22) Filed: Oct. 24, 2008

(65) Prior Publication Data

US 2009/0053970 A1    Feb. 26, 2009

Related U.S. Application Data

(63) Continuation of application No. 10/884,002, filed on Jul. 2, 2004, now Pat. No. 7,862,428.

(60) Provisional application No. 60/484,834, filed on Jul. 2, 2003.

(51) Int. Cl.
*G07F 17/32* (2006.01)

(52) U.S. Cl.
USPC .................................. 463/29; 463/32; 463/37

(58) Field of Classification Search
USPC ................................................ 463/29, 32, 37
See application file for complete search history.

(56) References Cited

U.S. PATENT DOCUMENTS

| | | |
|---|---|---|
| 5,255,834 A | 10/1993 | Bendersky |
| 5,411,259 A | 5/1995 | Pearson |
| 5,544,320 A | 8/1996 | Konrad |
| 5,606,652 A | 2/1997 | Silverbrook |
| 5,659,692 A | 8/1997 | Poggio et al. |
| 5,682,469 A | 10/1997 | Linnett et al. |
| 5,684,943 A | 11/1997 | Abraham |
| 5,717,869 A | 2/1998 | Moran et al. |
| 5,736,982 A | 4/1998 | Suzuki et al. |

(Continued)

FOREIGN PATENT DOCUMENTS

| | | |
|---|---|---|
| CA | 2475463 A1 | 8/2003 |
| DE | 10304779 A1 | 7/2003 |

(Continued)

OTHER PUBLICATIONS

Petition for the Director to Review the Denial of Reexamination Request No. 90/011,310, dated Jan. 6, 2011.

(Continued)

*Primary Examiner* — Omkar Deodhar
(74) *Attorney, Agent, or Firm* — Pearne & Gordon LLP

(57) ABSTRACT

An action figure is provided with a serial number that provides an access code which allows owners to engage in enjoyable games or other activities via the Internet or other gaming systems. The interactive action figure system comprises a toy, statue, or other three-dimensional figurine with a serial number, and preferably a computer network accessible over the internet and a particular gaming framework managed by a network device. Owners of action figure toys may "log onto" the network using the action figure serial number as an access code to activate a particular computer character identity and participate in games such as hand-to-hand combat games, action-adventure series, or learning games. The action figure may be, for example, a warrior, sports figure, doll or teddy bear to appeal to a wide range of users. Once a particular character is activated, game play proceeds according to preset rules. The game character's traits, powers, and other features may be enhanced or otherwise modified by purchasing preferably-three-dimensional accessories and inputting serial numbers into the gaming system that are also supplied with the accessories.

75 Claims, 4 Drawing Sheets

(56) References Cited

U.S. PATENT DOCUMENTS

| | | |
|---|---|---|
| 5,802,296 A | 9/1998 | Morse |
| 5,822,428 A | 10/1998 | Gardner |
| 5,853,327 A | 12/1998 | Gilboa |
| 5,880,731 A | 3/1999 | Liles et al. |
| 5,886,697 A | 3/1999 | Naughton et al. |
| 5,890,963 A | 4/1999 | Yen |
| 5,923,330 A | 7/1999 | Tarlton |
| 5,926,179 A | 7/1999 | Matsuda et al. |
| 5,956,038 A | 9/1999 | Rekimoto |
| 5,959,281 A | 9/1999 | Domiteaux |
| 5,964,660 A | 10/1999 | James |
| 5,966,526 A | 10/1999 | Yokoi |
| 6,009,458 A | 12/1999 | Hawkins et al. |
| 6,012,961 A | 1/2000 | Sharpe, III et al. |
| 6,031,549 A | 2/2000 | Hayes-Roth |
| 6,049,778 A | 4/2000 | Walker |
| 6,057,856 A | 5/2000 | Miyashita et al. |
| 6,072,466 A | 6/2000 | Shah et al. |
| 6,081,830 A | 6/2000 | Schindler |
| 6,159,101 A | 12/2000 | Simpson |
| 6,173,267 B1 | 1/2001 | Cairns |
| 6,175,857 B1 | 1/2001 | Hachiya et al. |
| 6,200,216 B1 | 3/2001 | Peppel |
| 6,210,272 B1 | 4/2001 | Brown |
| 6,219,045 B1 | 4/2001 | Leahy et al. |
| 6,227,931 B1 | 5/2001 | Shackelford |
| 6,227,966 B1 | 5/2001 | Yokoi |
| 6,251,017 B1 | 6/2001 | Leason |
| 6,253,167 B1 | 6/2001 | Matsuda |
| 6,267,672 B1 | 7/2001 | Vance |
| 6,268,872 B1 | 7/2001 | Matsuda et al. |
| 6,273,815 B1 | 8/2001 | Stuckman et al. |
| 6,290,565 B1 | 9/2001 | Galyean, III et al. |
| 6,290,566 B1 | 9/2001 | Gabai et al. |
| 6,311,195 B1 | 10/2001 | Hachiya |
| 6,352,478 B1 | 3/2002 | Gabai et al. |
| 6,356,867 B1 | 3/2002 | Gabai et al. |
| 6,368,177 B1 | 4/2002 | Gabai et al. |
| 6,388,665 B1 | 5/2002 | Linnett et al. |
| 6,394,872 B1 | 5/2002 | Watanabe et al. |
| 6,404,438 B1 | 6/2002 | Hatlelid et al. |
| 6,406,370 B1 | 6/2002 | Kumagai |
| 6,449,518 B1 | 9/2002 | Yokoo et al. |
| 6,468,155 B1 | 10/2002 | Zucker |
| 6,476,830 B1 | 11/2002 | Farmer et al. |
| 6,493,001 B1 | 12/2002 | Takagi et al. |
| 6,494,762 B1 | 12/2002 | Bushmitch |
| 6,519,771 B1 | 2/2003 | Zenith |
| 6,522,333 B1 | 2/2003 | Hatlelid et al. |
| 6,539,400 B1 | 3/2003 | Bloomfield et al. |
| 6,554,679 B1 | 4/2003 | Shackelfrod et al. |
| 6,559,863 B1 | 5/2003 | Megiddo |
| 6,560,511 B1 | 5/2003 | Yokoo et al. |
| 6,572,431 B1 | 6/2003 | Maa |
| 6,574,606 B1 | 6/2003 | Bell et al. |
| 6,587,834 B1 | 7/2003 | Dixon, III |
| 6,595,858 B1 | 7/2003 | Tajiri et al. |
| 6,609,968 B1 | 8/2003 | Okada |
| 6,612,501 B1 | 9/2003 | Woll et al. |
| 6,616,532 B2 | 9/2003 | Albrecht |
| 6,650,761 B1 | 11/2003 | Rodriguez et al. |
| 6,663,105 B1 | 12/2003 | Sullivan et al. |
| 6,685,565 B2 | 2/2004 | Tanibuchi et al. |
| 6,692,360 B2 | 2/2004 | Kusuda |
| 6,704,784 B2 | 3/2004 | Matsuda |
| 6,719,604 B2 | 4/2004 | Chan |
| 6,720,949 B1 | 4/2004 | Pryor |
| 6,722,973 B2 | 4/2004 | Akaishi |
| 6,727,925 B1 | 4/2004 | Bourdelais |
| 6,729,884 B1 | 5/2004 | Kelton |
| 6,734,884 B1 | 5/2004 | Berry |
| 6,734,885 B1 | 5/2004 | Matsuda |
| 6,735,324 B1 | 5/2004 | McKinley et al. |
| 6,739,941 B1 | 5/2004 | Brownsberger |
| 6,758,678 B2 | 7/2004 | Van Gilder et al. |
| 6,772,195 B1 | 8/2004 | Hatlelid et al. |
| 6,773,325 B1 | 8/2004 | Mawle et al. |
| 6,773,344 B1 | 8/2004 | Gabai et al. |
| 6,800,013 B2 | 10/2004 | Liu |
| 6,813,605 B2 | 11/2004 | Nakamura et al. |
| 6,845,486 B2 | 1/2005 | Yamada et al. |
| 6,890,179 B2 | 5/2005 | Rogan |
| 6,899,333 B2 | 5/2005 | Weisman |
| 6,910,186 B2 | 6/2005 | Kim |
| 6,918,833 B2 | 7/2005 | Emmerson |
| 6,944,421 B2 | 9/2005 | Axelrod |
| 6,951,516 B1 | 10/2005 | Eguchi et al. |
| 6,954,728 B1 | 10/2005 | Kusumoto et al. |
| 6,959,166 B1 | 10/2005 | Gabai |
| 7,012,602 B2 | 3/2006 | Watson et al. |
| 7,037,166 B2 | 5/2006 | Shrock et al. |
| 7,039,940 B2 | 5/2006 | Weatherford |
| 7,042,440 B2 | 5/2006 | Pryor |
| 7,054,831 B2 | 5/2006 | Koenig |
| 7,058,897 B2 | 6/2006 | Matsuda |
| 7,061,493 B1 | 6/2006 | Cook |
| 7,062,722 B1 | 6/2006 | Carlin et al. |
| 7,066,781 B2 | 6/2006 | Weston |
| 7,076,445 B1 | 7/2006 | Cartwright |
| 7,081,033 B1 | 7/2006 | Mawle et al. |
| 7,086,005 B1 | 8/2006 | Matsuda |
| 7,089,083 B2 | 8/2006 | Yokoo et al. |
| 7,143,358 B1 | 11/2006 | Yuen |
| 7,155,680 B2 | 12/2006 | Akazawa et al. |
| 7,168,051 B2 | 1/2007 | Robinson et al. |
| 7,171,154 B2 | 1/2007 | Fujisawa et al. |
| 7,179,171 B2 | 2/2007 | Forlines |
| 7,181,690 B1 | 2/2007 | Leahy et al. |
| 7,191,220 B2 | 3/2007 | Ohwa |
| 7,208,669 B2 | 4/2007 | Wells |
| 7,229,288 B2 | 6/2007 | Stuart et al. |
| 7,249,139 B2 | 7/2007 | Chuah et al. |
| 7,266,522 B2 | 9/2007 | Dutta et al. |
| 7,288,028 B2 | 10/2007 | Rodriquez et al. |
| 7,314,407 B1 | 1/2008 | Pearson |
| 7,425,169 B2 | 9/2008 | Ganz |
| 7,442,108 B2 | 10/2008 | Ganz |
| 7,448,231 B2 | 11/2008 | Jeanvoine et al. |
| 7,465,212 B2 | 12/2008 | Ganz |
| 7,478,047 B2 | 1/2009 | Loyall et al. |
| 7,488,231 B2 | 2/2009 | Weston |
| 7,534,157 B2 | 5/2009 | Ganz |
| 7,548,242 B1 | 6/2009 | Hughes et al. |
| 7,568,964 B2 | 8/2009 | Ganz |
| 7,604,525 B2 | 10/2009 | Ganz |
| 7,618,303 B2 | 11/2009 | Ganz |
| 7,677,948 B2 | 3/2010 | Ganz |
| 7,789,726 B2 | 9/2010 | Ganz |
| 7,850,527 B2 | 12/2010 | Barney et al. |
| 7,862,428 B2 | 1/2011 | Borge |
| 7,908,324 B2 | 3/2011 | Shochet et al. |
| 2001/0020955 A1 | 9/2001 | Nakagawa et al. |
| 2001/0031603 A1 | 10/2001 | Gabai et al. |
| 2001/0039206 A1 | 11/2001 | Peppel |
| 2002/0002514 A1 | 1/2002 | Kamachi et al. |
| 2002/0022523 A1 | 2/2002 | Dan et al. |
| 2002/0022992 A1 | 2/2002 | Miller et al. |
| 2002/0022993 A1 | 2/2002 | Miller et al. |
| 2002/0022994 A1 | 2/2002 | Miller et al. |
| 2002/0026357 A1 | 2/2002 | Miller et al. |
| 2002/0026358 A1 | 2/2002 | Miller et al. |
| 2002/0036617 A1 | 3/2002 | Pryor |
| 2002/0040327 A1 | 4/2002 | Owa |
| 2002/0054094 A1 | 5/2002 | Matsuda |
| 2002/0065746 A1 | 5/2002 | Lewis |
| 2002/0065890 A1 | 5/2002 | Barron |
| 2002/0068500 A1 | 6/2002 | Gabai et al. |
| 2002/0082077 A1 | 6/2002 | Johnson et al. |
| 2002/0090985 A1 | 7/2002 | Tochner et al. |
| 2002/0094851 A1 | 7/2002 | Rheey |
| 2002/0111808 A1 | 8/2002 | Feinberg |
| 2002/0113809 A1 | 8/2002 | Akazawa et al. |
| 2002/0119810 A1 | 8/2002 | Takatsuka |
| 2002/0130894 A1 | 9/2002 | Young et al. |

(56) References Cited

U.S. PATENT DOCUMENTS

| | | |
|---|---|---|
| 2002/0147640 A1 | 10/2002 | Daniele |
| 2002/0160835 A1 | 10/2002 | Fujioka et al. |
| 2002/0161666 A1 | 10/2002 | Fraki |
| 2002/0168919 A1 | 11/2002 | Perkins |
| 2002/0169668 A1 | 11/2002 | Bank et al. |
| 2002/0169672 A1 | 11/2002 | Barnhart |
| 2002/0183119 A1 | 12/2002 | Fessler |
| 2002/0198781 A1 | 12/2002 | Cobley |
| 2002/0198940 A1 | 12/2002 | Bower et al. |
| 2003/0004889 A1 | 1/2003 | Fiala |
| 2003/0018523 A1 | 1/2003 | Rappaport et al. |
| 2003/0034955 A1 | 2/2003 | Gilder et al. |
| 2003/0055984 A1 | 3/2003 | Shimakawa et al. |
| 2003/0061161 A1 | 3/2003 | Black |
| 2003/0088467 A1 | 5/2003 | Culver |
| 2003/0126031 A1 | 7/2003 | Asami |
| 2003/0220885 A1 | 11/2003 | Lucarelli et al. |
| 2003/0222902 A1 | 12/2003 | Chupin et al. |
| 2003/0232649 A1 | 12/2003 | Gizis et al. |
| 2004/0030595 A1 | 2/2004 | Park |
| 2004/0043806 A1 | 3/2004 | Kirby et al. |
| 2004/0046736 A1 | 3/2004 | Pryor et al. |
| 2004/0053690 A1 | 3/2004 | Fogel et al. |
| 2004/0075677 A1 | 4/2004 | Loyall et al. |
| 2004/0092311 A1 | 5/2004 | Weston et al. |
| 2004/0093266 A1 | 5/2004 | Dohring |
| 2004/0153557 A1 | 8/2004 | Shochet et al. |
| 2004/0189702 A1 | 9/2004 | Hlavac et al. |
| 2004/0193489 A1 | 9/2004 | Boyd |
| 2004/0219961 A1 | 11/2004 | Ellenby |
| 2004/0229696 A1 | 11/2004 | Beck |
| 2004/0242326 A1 | 12/2004 | Fujisawa et al. |
| 2004/0259465 A1 | 12/2004 | Wright et al. |
| 2005/0043076 A1 | 2/2005 | Lin |
| 2005/0049725 A1 | 3/2005 | Huang |
| 2005/0059483 A1 | 3/2005 | Borge |
| 2005/0071225 A1 | 3/2005 | Bortolin |
| 2005/0114272 A1 | 5/2005 | Herrmann et al. |
| 2005/0137015 A1 | 6/2005 | Rogers |
| 2005/0177428 A1 | 8/2005 | Ganz |
| 2005/0192864 A1 | 9/2005 | Ganz |
| 2005/0250415 A1 | 11/2005 | Barthold |
| 2005/0250416 A1 | 11/2005 | Barthold |
| 2005/0272504 A1 | 12/2005 | Eguchi et al. |
| 2005/0287925 A1 | 12/2005 | Proch et al. |
| 2006/0035692 A1 | 2/2006 | Kirby et al. |
| 2006/0079150 A1 | 4/2006 | Filoseta et al. |
| 2006/0080539 A1 | 4/2006 | Asami |
| 2006/0093142 A1 | 5/2006 | Schneier et al. |
| 2006/0100018 A1 | 5/2006 | Ganz |
| 2006/0166593 A1 | 7/2006 | Shrock et al. |
| 2006/0285441 A1 | 12/2006 | Walker |
| 2007/0050716 A1 | 3/2007 | Leahy et al. |
| 2007/0143679 A1 | 6/2007 | Resner |
| 2008/0009350 A1 | 1/2008 | Ganz |
| 2008/0009351 A1 | 1/2008 | Ganz |
| 2008/0026666 A1 | 1/2008 | Ganz |
| 2008/0109313 A1 | 5/2008 | Ganz et al. |
| 2008/0134099 A1 | 6/2008 | Ganz |
| 2008/0163055 A1 | 7/2008 | Ganz et al. |
| 2009/0029768 A1 | 1/2009 | Ganz |
| 2009/0029772 A1 | 1/2009 | Ganz |
| 2009/0053970 A1 | 2/2009 | Borge |
| 2009/0054155 A1 | 2/2009 | Borge |
| 2009/0063282 A1 | 3/2009 | Ganz |
| 2009/0118009 A1 | 5/2009 | Ganz |
| 2009/0131164 A1 | 5/2009 | Ganz |
| 2009/0204420 A1 | 8/2009 | Ganz |
| 2010/0151940 A1 | 6/2010 | Borge |

FOREIGN PATENT DOCUMENTS

| | | |
|---|---|---|
| EP | 1228792 A1 | 8/2002 |
| GB | 2365364 | 2/2002 |
| JP | 200057373 A | 2/2000 |
| JP | 2001222585 | 8/2001 |
| JP | 2001222585 A | 8/2001 |
| JP | 2001321571 A | 11/2001 |
| JP | 2001283024 A | 12/2001 |
| JP | 2002016171 | 1/2002 |
| JP | 2002063092 | 2/2002 |
| JP | 2002-134481 A | 5/2002 |
| JP | 2002134481 | 5/2002 |
| JP | 2002297498 A | 10/2002 |
| JP | 2003016035 A | 1/2003 |
| JP | 2003248650 A | 5/2003 |
| JP | 2003205178 | 7/2003 |
| JP | 2003210843 | 7/2003 |
| JP | 2003242058 A | 8/2003 |
| KR | 1073524 A | 8/2001 |
| WO | 99/42917 A2 | 8/1999 |
| WO | 0033533 | 6/2000 |
| WO | 01/69572 A1 | 9/2001 |
| WO | 01/69829 A2 | 9/2001 |
| WO | 01/69830 A1 | 9/2001 |
| WO | 01/90841 A1 | 11/2001 |
| WO | 02/22224 A1 | 3/2002 |
| WO | 0221407 A1 | 3/2002 |
| WO | 0227591 A | 4/2002 |
| WO | 02/054327 A1 | 7/2002 |
| WO | 02079925 A2 | 10/2002 |
| WO | 02099581 A2 | 12/2002 |
| WO | 03/034303 A1 | 4/2003 |
| WO | 03026764 A2 | 4/2003 |
| WO | 03071389 A2 | 8/2003 |
| WO | 2005/064502 A1 | 7/2005 |

OTHER PUBLICATIONS

Status Inquiry on Petition for the Director to Review the Denial of Reexamination Request No. 90/011,310, dated Jan. 13, 2012.
Denial of Petition for the Director to Review the Denial of Reexamination Request No. 90/011,310, dated Jan. 26, 2012.
Examiner's Answer of Reexamination Request No. 95/001,341, dated Apr. 12, 2012.
Rebuttal Brief of 3rd Party Requestor of Reexamination Request No. 95/001,341, dated May 10, 2012.
Appellant's Brief of Reexamination Request No. 95/001,343, dated Feb. 14, 2012.
Respondent's Brief of Reexamination Request No. 95/001,343, dated Mar. 8, 2012.
Examiner's Answer of Reexamination Request No. 95/001,343, dated Apr. 25, 2012.
Rebuttal Brief of 3rd Party Requestor of Reexamination Request No. 95/001,345, dated Dec. 14, 2011.
BPAI Docketing Notice of Reexamination Request No. 95/001,345, dated Apr. 9, 2012.
Rebuttal Brief Entry of Reexamination Request No. 95/001,345, dated Mar. 27, 2012.
Right of Appeal Notice of Reexamination Request No. 95/001,422, dated Apr. 2, 2012.
Notice of Appeal by 3rd Party Requestor of Reexamination Request No. 95/001,422, dated Apr. 17, 2012.
Rebuttal Brief of Patent Owner of Reexamination Request No. 95/001,343, dated May 25, 2012.
Decision on Appeal of Reexamination Request No. 95/001,345, dated Jun. 12, 2012.
Extension of Time Petition of Reexamination Request No. 95/001,345, dated Jul. 2, 2012.
Decision on Petition of Reexamination Request No. 95/001,345, dated Jul. 12, 2012.
Request to Reopen Prosecution of Reexamination Request No. 95/001,345, dated Jul. 12, 2012.
Third Party Requestor's Reply to Request of Reexamination Request No. 95/001,345, dated Aug. 9, 2012.
Examiner's Answer of Reexamination Request No. 95/001,422, dated Aug. 15, 2012.
Decision on Appeal of Reexamination Request No. 95/001,341, dated Oct. 30, 2012.

(56) References Cited

OTHER PUBLICATIONS

Request to Reopen Prosecution of Reexamination Request No. 95/001,341, dated Nov. 30, 2012.
Decision on Appeal of Reexamination Request No. 95/001,343, dated Oct. 30, 2012.
Order Denying Request Reopen of Reexamination Request No. 95/001,345, dated Nov. 7, 2012.
Renewed Request Reopen of Reexamination Request No. 95/001,345, dated Nov. 21, 2012.
Rebuttal Brief of 3rd Party of Reexamination Request No. 95/001,422, dated Sep. 13, 2012.
Rebuttal Brief Entered of Reexamination Request No. 95/001,422, dated Nov. 15, 2012.
Appeal Docketing Notice of Reexamination Request No. 95/001,422, dated Nov. 26, 2012.
Right of Appeal notice for Inter Partes Reexamination of U.S. Patent No. 7,604,525 dated Nov. 14, 2011.
Examiners Answer for Inter Partes Reexamination of U.S. Patent No. 7,568,964 dated Nov. 15, 2011.
Action Closing Prosecution for Inter Partes Reexamination of U.S. Patent No. 7,618,303 dated Nov. 14, 2011.
Telecomworldwide et al; "Product Sidewire", Newsletter, Oct. 10, 1995, M2 Communications ISSN: 1363-9900.
International Search Report for PCT/CA2004/002206 dated May 2, 2005.
Microsoft et al; "Microsoft announces launch date for UltraCorps—second premium title for the Internet Gaming Zone Oblivion", M2 presswire, Newswire; Trade, May 28, 1998.
Japanese Patent Office, Decision of Refusal, Japanese Application No. 2006-545875, Dated Feb. 18, 2009.
Second Request for Reexamination of U.S. Patent No. 7,618,303—with Exhibits B, C, D, E, F, L and M; dated Aug. 24, 2010.
Order Granting Request for Inter Partes Reexamination of U.S. Patent No. 7,677,948; dated Jul. 9, 2010.
Order Granting Request for Inter Partes Reexamination of U.S. Patent No. 7,604,525; dated Jul. 9, 2010.
Order Granting Request for Inter Partes Reexamination of U.S. Patent No. 7,568,964; dated Jul. 10, 2010.
Request for Reexamination of U.S. Patent No. 7,677,948—with Exhibits B,C,D,E,O,P,Q,R,S,T; dated Apr. 20, 2010.
U.S. Copyright Registrations for The Sims expansion packs; dated Apr. 20, 2010.
Request for Reexamination of U.S. Patent No. 7,618,303—with Exhibits B, C, D, E, M, N, and O; dated Apr. 20, 2010.
Request for Reexamination of U.S. Patent No. 7,604,525—with Exhibits H, I, J, K, L, X, and Y; dated Apr. 20, 2010.
Request for Reexamination of U.S. Patent No. 7,568,964—with Exhibits B, C, N, O, R, S; dated Apr. 20, 2010.
Office action from Reexam GANZ-36219US25 dated Aug. 19, 2010.
Action Closing Prosecution of Inter Partes Reexamination of U.S. Patent No. 7,677,948 Date=Sep. 14, 2010.
Action Closing Prosecution of Inter Partes Reexamination of U.S. Patent No. 7,568,964 Date=Sep. 18, 2010.
Notice of Appeal in Inter Partes Reexamination of of U.S. Patent No. 7,568,964 dated Feb. 10, 2011.
3rd Party Comments re: Response to Office action for Inter Partes Reexamination of U.S. Patent No. 7604525, dated Nov. 2, 2010.
Action Closing Prosecution for Inter Partes Reexamination of U.S. Patent No. 7604525, dated Feb. 25, 2010.
Amendment and Response to Office action for Inter Partes Reexamination of U.S. Patent No. 7604525, dated Oct. 19, 2010.
Intl Search Report—PCT-CA2009-000271, dated Sep. 7, 2010.
Order Denying Ex Partes Reexamination of U.S. Patent No. 7,568,964 dated Dec. 10, 2010.
Order Granting Request for Inter Partes Reexamination of U.S. Patent No. 7,618,303, dated Nov. 8, 2010.
Petition to Review Denial for Ex Partes Reexamination of U.S. Patent No. 7,568,964 dated Jan. 6, 2011.
Request for ExParte Reexamination of U.S. Patent No. 7,568,964—no Exhibits, dated Nov. 1, 2010.

USPTO Communication Form for Ex Partes Reexamination of U.S. Patent No. 7,568,964 dated Nov. 12, 2010.
Search Report—AU-2009202828, dated Jan. 13, 2011.
Search Report—AU-2009202829, dated Jan. 4, 2011.
Search Report—AU-2009202831, dated Jan. 12, 2011.
Office action for Inter Partes Reexamination of U.S. Patent No. 7,618,303—dated Dec. 17, 2010.
Right of Appeal notice for Inter Partes Reexamination of U.S. Patent No. 7,568,964 dated Jan. 15, 2011.
Right of Appeal notice for Inter Partes Reexamination of U.S. Patent No. 7,677,948 dated Jan. 18, 2011.
Search Report—CA2696620—Mar. 1, 2011.
neopets.com "The Ottawa Citizen" dated Feb. 7, 2000.
neopets.com "The Toronto Star" dated Mar. 13, 2003.
monopets.com "registration page", archive dated Dec. 12, 2002.
http://www.lego.com, Feb. 6, 2003, archive version found on www.archive.org—"Wayback Machine".
Grace, "Web Site Tycoon's Next Goal: Sixth Grade; Internet Pet Site Tallies 5 Million Visits a Month," Woonsocket Call, Jun. 19, 2002.
http://web.archive.org.web.20031202190119/www.monopets.com/, Dec. 2, 2003.
Johnson, M.P., et al., Sympathetic Interfaces: Using a Plush Toy to Direct Synthetic Characters. Proceedings of the CHI 99 Conference on Human Factors in Computing Systems, 1999.
Reexamination Request No. 95/001,343—NTC of Intent to Issue Reexam Certificate Feb. 27, 2013.
Reexamination Request No. 95/001,422—Board Decision Feb. 13, 2013.
Reexamination Request No. 95/001,422—Patent Owner's Response After Closing Prosecution. Cert of Service Mar. 13, 2013.
Reexamination Request No. 95/001,345—Order Remanding Inter Partes Reexamination to the Examiner Mar. 19, 2013.
Inter Parties Reexamination Certificate for 95/001,343 Issued Apr. 24, 2013.
Examiner's Determination for 95/001,345 Issued May 11, 2013.
Reexamination Request No. 95/001,422—Final Board Decision Issued Jun. 4, 2013.
"The Sims Booklet," dated 2000.
"The Sims 10th Anniversary", http://thesims2.ea.com/, dated Feb. 26, 2010.
PC Magazine, "The Sims Online Arrives," dated Dec. 18, 2002.
Prima's Official Strategy Guide—The Sims, dated 2000.
"The Sims", http://en.wikipedia.org/wiki/, retrieved Feb. 6, 2010.
CNET News, "Who Let the Neopets out?" dated Feb. 26, 2002.
Neopets The Official Magazine, dated Nov. 18, 2003.
Neopian Hospital, retrieved Mar. 24, 2010.
Pojo's Unofficial Guide to Neopets, 2003.
Neopets—Archeology, retrieved Mar. 25, 2010.
Nothing but Neopets, "Neopian History.", retrieved Mar. 24, 2010.
The Neopian Times, Week 32, retrieved Mar. 25, 2010.
The Neopian Times, Week 42, retrieved Mar. 25, 2010.
The Helpful Neopian, retrieved Mar. 25, 2010.
Nothing but Neopets, "Dec. 2002".
The Sims: News, "Details about Makin Magic," Jul. 11, 2003.
U.S. Appl. No. 12/707,055, Filed Feb. 17, 2010.
Monopets, "The Gurgle," plush toy, undated, (photographs taken Aug. 2007).
Request for Reexamination of U.S. Patent No. 7,677,948—with Exhibits B,C,D,E,O,P,Q,R,S,T—Dated Apr. 20, 2010.
U.S. Copyright Registrations for The Sims expansion packs—Dated 2001.
Request for Reexamination of U.S. Patent No. 7,618,303—with Exhibits B, C, D, E, M, N, and O—Dated Apr. 20, 2010.
Request for Reexamination of U.S. Patent No. 7,604,525—with Exhibits H, I, J, K, L, X, and Y—Dated Apr. 20, 2010.
Request for Reexamination of U.S. Patent No. 7,568,964—with Exhibits B, C, N, 0, R, S—Dated Apr. 20, 2010.
Reexamination 95/001,422—NTC of Intent to Issue a Reexam Certificate, dated Sep. 30, 2013.
"The Sims Deluxe Edition" www.replacementdocs.com, dated Sep. 17, 2002.
Reexamination 95/001,341—Order Remanding Reexam to Examiner for Consideration, dated Jul. 31, 2013.

INTERACTIVE ACTION FIGURES FOR GAMING SYSTEMS

This application claims priority of provisional application, Ser. No. 60/484,834, filed Jul. 2, 2003, which is incorporated herein by this reference.

BACKGROUND OF THE INVENTION

1. Field of the Invention

This invention relates generally to gaming platforms available on the Internet, computer CDs, or other gaming systems. More specifically, this invention relates to an action figure and/or three-dimensional accessories that include access codes enabling users to engage in various games and activities wherein the particular action figure and accessories are reflected in an electronic identity corresponding to the access codes.

2. Related Art

The advancement of the Internet has brought about many opportunities for users to engage in games and other activities including those in which individual users compete against one another. These games and activities allow users to interact in various capacities. For example, some gaming platforms allow users to play simple card games against one another, while others allow Internet users to compete against their peers in action and/or adventure simulations such as those in which various characters duel in hand-to-hand combat.

In U.S. Pat. No. 5,964,660 (James et al.) an Internet gaming system is disclosed that allows a large number of computer users running a Web browser to play a game via the network. Users input moves and become apprised of the state of the game, using the basic input/output functions of their browser.

U.S. Pat. No. 6,276,672 B1 (Vance) teaches a remotely accessible game, such as an Internet game, to encourage consumers to purchase specific products. When a product like a bottle of water is purchased, an access code is provided inside the label or beneath the cap. Using the access code as a login password, consumers may take part in a particular game.

US Patent Application No. US2002/0183119A1 (Fessler) describes an external game enhancer that may be used with an electronic gaming system. The game enhancer may be a small plug-in external item, containing storage memory, which can be quickly and directly connected to the electronic gaming platform so that the memory is accessible by the gaming machine when the game is played. The game enhancer may be built into a toy or consumer product like a key chain.

U.S. Pat. No. 6,616,532 B2 (Albrecht) also describes a game enhancement system that provides a consumer product with a memory device that may be transferred to the game memory for enhancing the functionality of the electronic game. Alternatively, a pass word for enhancing the functionality of the electronic game may be provided to a consumer upon purchase of a product.

SUMMARY OF THE INVENTION

The invention comprises a gaming platform and/or an action figure adapted to interact with the gaming platform. The characteristics of a computer game character are related to a customizable action figure that may, in itself, be a source of entertainment or a display item for users even when said users are not connected to the gaming platform. The customizable action figure may provide access for game users to participate remotely in games and/or other activities via the Internet or other computer or game programs. Alternatively or additionally, the customizable action figure may allow game users to enhance the character/team, for example, by changing their characteristics, such as attributes, powers, weapons, equipment, experience points, levels, feats, strengths, weaknesses, etc. This access and/or enhancement may be provided by inputting, into the gaming platform, one or more serial numbers that are associated with the action figure and/or accessories for the action figure. Preferably, the gaming platform is adapted to save the character with its enhanced attributes, so that the user may later return to the game with the character in the same condition as when the user left the game. The action figure may provide not only access or enhancement to an enjoyable activity via its interaction with the Internet or other gaming platform, but also a source of entertainment in its physical, toy form.

DETAILED DESCRIPTION OF THE INVENTION

Figure 1:
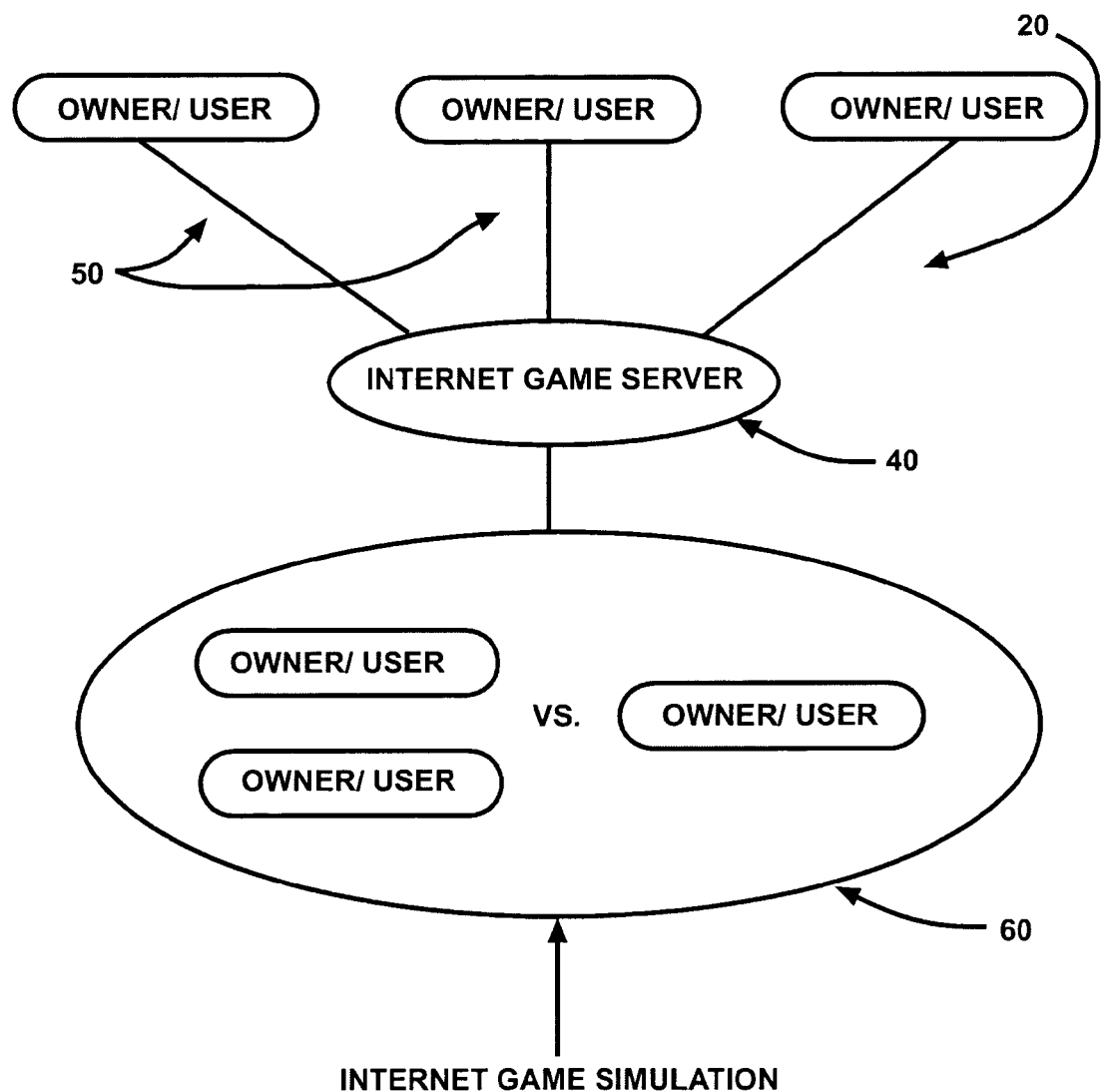
FIG. 1 is a schematic view of one embodiment of an invented interactive gaming platform accessible via the Internet.

In preferred embodiments of the invention, each action figure corresponds to a different computer identity, or character, in a variety of different gaming platforms managed by remote servers, and/or in other computer or game programs. When the action figure and/or programming is designed or and manufactured, information based on the physical attributes of the action figure is programmed into the server/program to create the particular character identity in the gaming platform. A serial number is provided on or with the action figure, either on a surface of the action figure or in the packaging for the action figure. For example, the serial number may be provided by etching, molding, or adhesive or tied-on label. Alternatively, the serial number may be provided by including it on or inside the packaging for the action figures, for example, on a tag, sheet, or ID tag inside the box. Preferably, the serial number is not visible from the outside of the packaging, so that a consumer may not see or record the serial number until he/she purchases the action and opens the packaging. The serial number may be a number and/or letters, and may or may not convey, when simply read or viewed by the consumer, information about the character, accessory, or characteristic. For example, a serial number may be styled such as: 1035589, SM1035589, SUPERMAN-STRENGTH1035589, 4011856, H4011856, HEALTH4011856, etc. Any number of action figures may be supplied with a single serial number. For example, different superhero action figures preferably will have different serial numbers, for example, one serial number for all Spiderman™ action figures, and a different serial number for all Green Goblin™ action figures. Or, a certain portion of a single superhero may have one serial number and another portion of that same superhero may have a different serial number. Or, every action figure may have a different serial number. Other system of serial numbers may be designed.

When the action figure is purchased, the owner of the action figure uses the serial number provided with the action figure as an access code to 1) access a game/activity; and/or 2) access a character in the game/activity, depending on the embodiment of the gaming platform. The programming and instructions may instruct the owner to input all of the serial number, or a portion of the serial number (such as the numbers only). Once the game and/or the character is activated, the character may, for example, compete against similar characters, embark on an adventure alone, or join a team of other characters in a competition or adventure.

Further, owners of such action figures may modify/enhance their game platform characters by purchasing accessories, each of which preferably is also are provided with a serial number. Upon registering the serial numbers of the various accessories with a particular electronic character, by inputting the accessory serial number into the gaming platform, these accessories become part of the identity of the game character for future use. These accessory items, for example, may be items or attributes, to make a character stronger, more dangerous, live longer, brandish different weapons, etc.

The action figures are preferably three-dimensional figures, in the form of miniature humans, superheros, animals, gods, mythical persons or beasts, robots, for example. Preferably, each of the action figures has visible features, such as body parts; hair, fur, feathers; clothing or armor; facial expressions; logos; or other features that make the action figure identifiable. These features may be molded, painted, attached or otherwise connected or provided on the action figure. The action figures may or may not have joints, bending limbs or parts, or other moveable parts. Some or all of these features are the information that is programmed into the character in the gaming system, at least to an extent that the viewer/player of the game, once the game character is accessed (preferably by the serial number on the three-dimensional action figure), recognizes that the character is the same person/animal/entity as the action figure. So, the action figure may be said to "visually correspond" to the electronic/computer game character, or to "be in the likeness of" the electronic/computer game character, and vice versa. Thus, the three-dimensional, physically tangible action figure has a substantial resemblance to the two-dimensional, digital character in the computer/game.

The "accessories" described above are preferably also three-dimensional, physically tangible items, purchased at a store, through a catalog, over the internet, or otherwise acquired. The accessories preferably are items that are miniatures of items that the action may be dressed in, ride on or in, fight with, or otherwise use in a hand, paw, claw, etc. Such items would be armor, leather couplets, chain mail, helmets, swords, guns, knives, laser weapons, grenades, horses, motorcycles, tanks, helicopters, etc. Thus, these items have a substantial resemblance to the enhancement that is being unlocked by the item's serial number, and these items may be attached to, held by, or mounted by, the action figure. Alternatively, the accessories may be items that are symbols of less tangible traits, such as health, strength, courage, wisdom, intelligence, weakness, etc. Such accessories may be a medallion or badge shaped like a small clenched fist for "strength"; a heart-shaped medallion or badge for "health"; a book-shaped medallion or badge for "wisdom", for example. Preferably, the accessory representing the less tangible trails are medallions or badges or other forms that can be attached to the action figure and that are sized appropriately for the size of the action figure. Other shapes or forms may be used, such as a plate, a banner, a tag, or simply an item to be placed beside the action figure. As with the action figure, the serial number may be applied directly onto the accessory item or in or on packaging for the accessory. As with the action figure, preferably the serial number is not visible to the consumer/owner until he or she opens the package.

Each time game play is suspended, information regarding the changing characteristics of the game "player" (the character) is stored on the server so that each time the game is accessed the most current "player" is retrieved. If there is only one game "player" active in a game, the user may stop play at any time and save his or her information. When more than one user is involved, play may be halted at any break in the action or at such point all users agree to stop. At some time in the course of game play, the character may become weaker or die. At this point, owners of the action figure may purchase additional strength or lives for their character or pay to have their character resurrected or cloned so that they can continue playing the game.

Referring now to the figures, an embodiment of an interactive action figure 10 for use with Internet gaming platforms 20 is illustrated. The interactive action figure comprises an action figure toy 10 which contains a serial number 25 corresponding to a specific computer identity or game character 30. The character 30 may be brought to life within a specific gaming network using the serial number 25 as a first access code. Providing the required access code 25 to the appropriate network server 40 or managing device activates the particular character 30 within the gaming framework. Once activated, the character 30 proceeds in the game according to the rules of the game. For example, the character 30 may compete in hand-to-hand combat against another similar character or embark upon an adventure alone.

Preferably, the invented interactive action figure 10 may take many physical forms to appeal to a wide range of users. For example, the action figure may be a warrior, a sports figure, a casino gambler, a doll, or a teddy bear. The specific gaming platform may then be designed around the particular figure and its intended audience. For example, a teddy bear may be intended for children and an appropriate computer identity may embark on an adventure that teaches valuable skills or lessons along the way. Alternatively, a warrior may appeal to a more adult audience. Consequently, its character may participate in a street fight or other intense or dangerous competition.

In a preferred embodiment, the gaming platform connects (50) a large number of individual users owning action figures and their corresponding computer identities, as shown in FIG. 1. Within the gaming platform, the characters may be formed into teams to compete in, for example, a soccer game, rugby competition, or a war (60). However, connecting users is not necessary so long as the individual user may access the appropriate computer identity using the action figure serial number and engage in an enjoyable activity via the Internet. Preferably, a centralized management device continually stores and updates character information as game play proceeds so that users may quit at any time and return to the game later and retrieve the most "current" computer identity for their action figure. For example, if a user completes a level in a game, this information would be stored and the user would not have to return to this level in the future. Preferably, where many users are active in a single game, users may quit at any time there is a break in play or when all users agree to suspend play.

Figure 2:
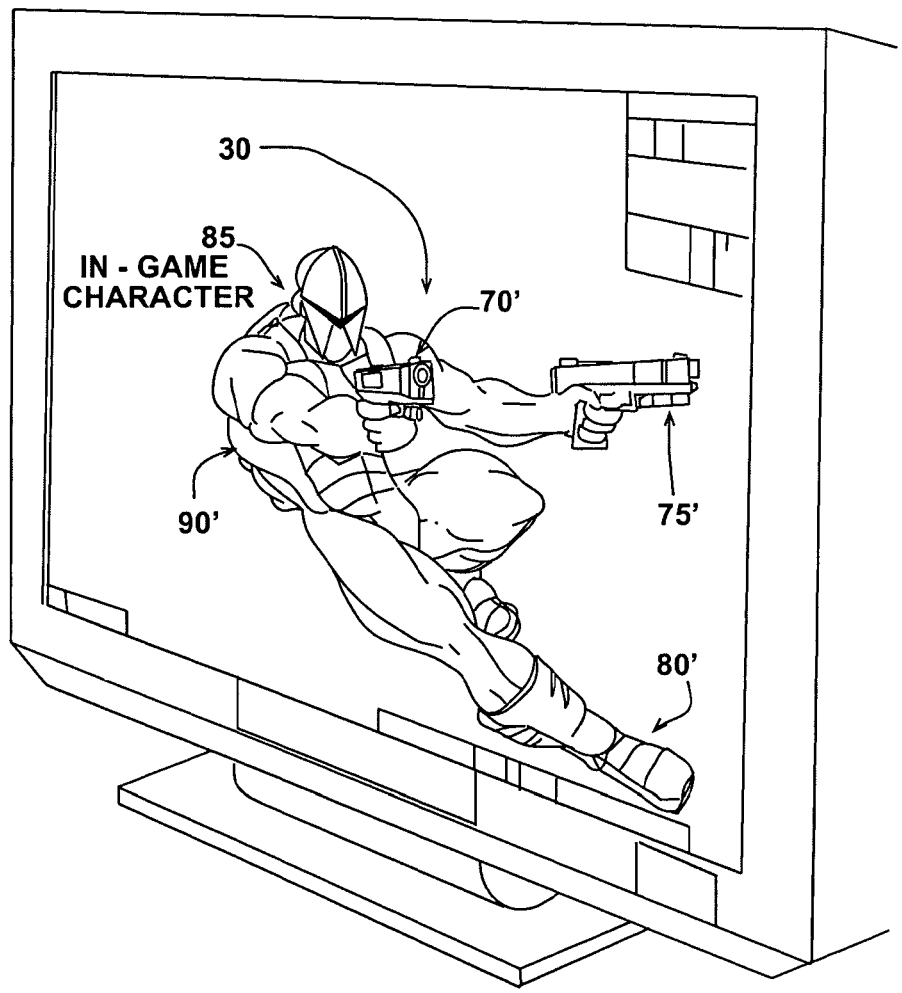
FIG. 2 is a perspective view of one embodiment of the invented interactive action figure in an Internal gaming platform, displayed on a computer screen.
Figure 3:
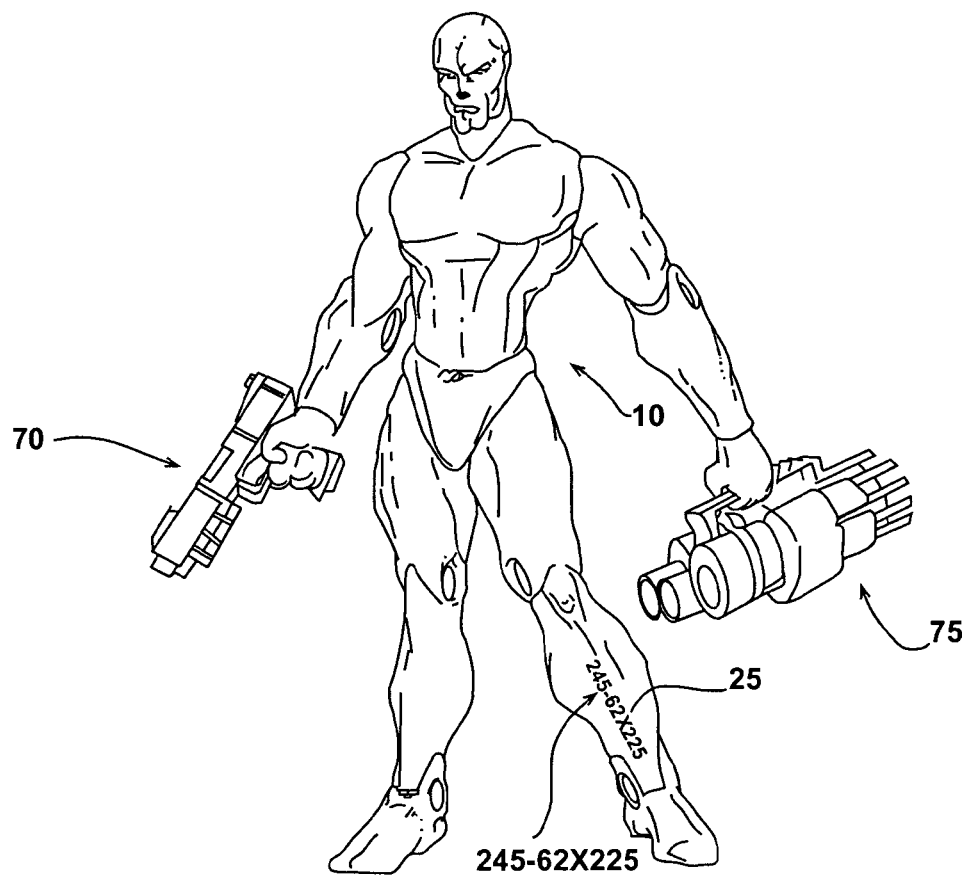
FIG. 3 is a perspective view of one embodiment of an action figure holding two accessories, and having a serial number on the leg surface (which is shown enlarged to the side of the leg).
Figure 4A:
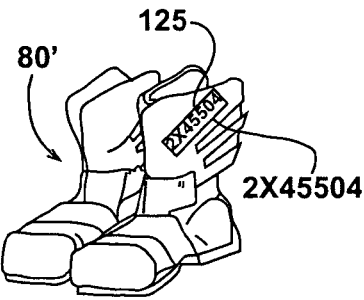
FIGS. 4A, 4B, 4C, 4D, and 4E illustrates embodiments of some possible accessories that may be purchased for the action figure of FIG. 3, and that may have their serial numbers input into the gaming platform of FIG. 1 to modify/enhance the game character of FIG. 2.
Figure 4B:
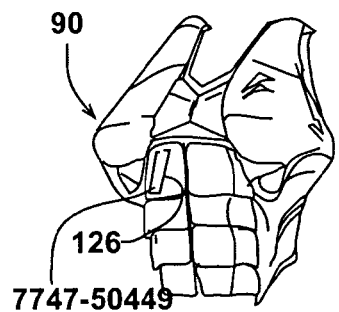
Figure 4C:
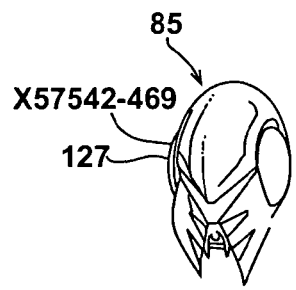
Figure 4D:
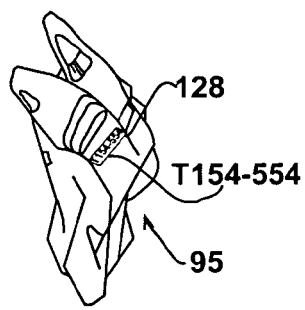
Figure 4E:
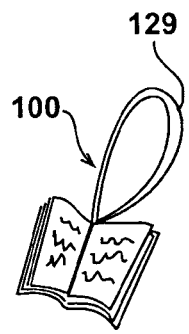

One of many possible embodiments of an invented interactive action figure 10 on the Internet is depicted in FIG. 2. This action figure 10 is shown in FIG. 3 in his basic form, with two weapon accessories 70, 75 already added. Additional accessories are shown in FIGS. 4A-4E, including boots 80, chest armor 90, face mask 85, arm armor 95, and wisdom (book) accessory 100. One may note the close resemblance between the action figure 10 in FIG. 3 and the game character 30 of FIG. 2, wherein the character has been enhanced with weapon accessories 70', 75', and boot 80', face mask 85', and chest armor 90' accessories).

As game play proceeds, users may update or modify their computer characters by purchasing accessories for their action figures, for example, according to the above description of accessories. Preferably, each accessory item has a serial number (125, 126, 127, 128, 129) or "secondary access code" with which it is associated, either by attaching or implanting the serial number to or in the accessory item, or by placing the serial number inside the packaging. After inputting the first access code (preferably the action figure's serial number) into the network managing system, one or more secondary access codes may be input to update the existing computer character identity. As described above, such accessory items may be intangible; for example, an individual may purchase accessory items that represent additional lives for their computer character or strength enhancers that bolster their chances of success. Alternatively, the accessory items may be physical items or equipment such as weapons or clothing as shown in FIG. 3. Inputting secondary codes for accessory items prompts the network managing system to associate these items with the computer identity corresponding to the first access code.

At some point in the course of game play, a specific character may expire within a particular gaming platform. For example, a character may die in the midst of a battle or come to the end of a particular journey after all preceding levels have been passed. If this occurs, an action figure owner may pay to have their character revived (for example, resurrected, cloned, or refreshed). This revival procedure may involve purchasing another action figure with an additional/updated serial number, or purchasing another serial number without buying another action figure via a revival product or service associated with the particular character, which may be distributed after payment is made to the manufacturer of the action figures or the manager of the gaming system.

While the preferred embodiments are described as being adapted for use in an Internet gaming platform, other gaming platforms may be used. For example, computer CD games, or gaming systems of the types represented by the popular PS2™ or X-box™ systems, might be adapted for use in embodiments of the invention. For example, such systems may be adapted to accept input of serial numbers to unlock games, characters, and/or characteristics of the characters, such as traits, weapons, weaknesses, etc. Therefore, while the current preferred embodiments include multiple users of Internet games, other embodiments and especially future embodiments may include non-Internet gaming systems for one or more users.

Although this invention has been described above with reference to particular means, materials, and embodiments, it is to be understood that the invention is not limited to these disclosed particulars, but extends instead to all equivalents within the scope of the following claims.

I claim:

1. A method for providing a computer activity to a user, said method comprising the steps of:
   registering a first product in response to a primary access code being entered on a computer, the primary access code being associated with the first product;
   responsive to registering the first product, creating an identity for a character for use in the computer activity;
   further responsive to registering the first product, providing content for displaying a visual representation of the character in the computer activity, the visual representation of the character corresponding to the first product;
   registering an accessory to the first product on the computer in response to a secondary access code being entered on a computer, the secondary access code being associated with the accessory; and
   responsive to registering the accessory, providing an enhancement that is stored in association with the identity of the character for future use in the computer activity without requiring the secondary access code to be entered again.

2. The method of claim 1, wherein the enhancement comprises an accessory item for use by the character in said computer activity.

3. The method of claim 2, further comprising providing additional content for displaying a visual representation of the accessory item in the computer activity, the visual representation of the accessory item corresponding to the accessory.

4. A method for providing a computer activity to a user, said method comprising the steps of:
   registering a first product on a computer, said registering including accepting information input into the computer by the user;
   responsive to registering the first product, providing an item for display in said computer activity, said item visually corresponding to said first product;
   registering an accessory to said first product on said computer; and
   responsive to registering the accessory, enhancing said item in said computer activity.

5. The method of claim 4, wherein said enhancing includes displaying an accessory item for said item in said computer activity.

6. The method of claim 5, wherein said accessory item for said item substantially resembles said accessory for said first product.

7. The method of claim 5, wherein said enhancing also includes displaying said accessory item in conjunction with said item to accessorize said item in said computer activity.

8. The method of claim 7, wherein said item possesses one or more traits in said computer activity, and wherein said enhancing also includes modifying at least one of said traits in said computer activity.

9. The method of claim 6, wherein said first product is one of an action figure, a doll, or a stuffed animal, and wherein said item is an animated character in said computer activity, and further wherein said accessory item is used by said animated character in said computer activity.

10. The method of claim 4, wherein said first product is representative of a living being, and wherein said accessory is one of clothing for the product, an item for the product to hold, an item for the product to wear, or representative of a symbol of a desired characteristic of the product.

11. The method of claim 10, wherein said enhancing also includes displaying an accessory item in conjunction with said item to accessorize said item in said computer activity.

12. The method of claim 11, wherein said item possesses one or more traits in said computer activity, and wherein said enhancing also includes modifying at least one of said traits in said computer activity.

13. The method of claim 4, wherein said item possesses one or more traits in said computer activity, and wherein said enhancing includes modifying at least one of said traits in said computer activity.

14. The method of claim 13, wherein said accessory for said first product is symbolic in a manner that anticipates said modification of said at least one of said traits.

15. The method of claim 14, wherein said first product is one of an action figure, a doll, or a stuffed animal, and wherein said item is an animated character in said computer activity.

16. The method of claim 4, wherein said first product is one of an action figure, a doll, or a stuffed animal, and wherein said item is an animated character in said computer activity.

17. The method of claim 4, wherein said information includes a first access code provided with said first product.

18. The method of claim 17, wherein said registering the accessory includes the step of accepting a second access code manually input into the computer by the user.

19. The method of claim 17, wherein the first access code is a human readable code that was initially hidden from the user.

20. The method of claim 4, wherein said first and said accessory are each a tangible product, and said information accepted is manually input by the user into the computer.

21. The method of claim 4, wherein said information accepted comprises a human readable code manually input by the user into the computer.

22. A method for providing a computer activity to a user, said method comprising the steps of:
   accepting a first human readable access code provided with a first tangible product and manually input by the user;
   registering the first tangible product using the first human readable access code input by the user;
   responsive to registering the first tangible product, providing an image in said computer activity, said image substantially resembling said first tangible product;
   registering an accessory to said first tangible product using a second access code provided with said accessory; and
   responsive to registering the accessory, modifying a characteristic of said image in said computer activity.

23. The method of claim 22, wherein said modifying the characteristic of said image includes providing an accessory item for said image.

24. The method of claim 23, wherein said accessory is tangible, and wherein said accessory item substantially resembles said accessory.

25. The method of claim 23, wherein said modifying the characteristic of said image further includes modifying a trait of said image.

26. The method of claim 23, wherein said accessory attaches to said first tangible product, and wherein said accessory item attaches to said image.

27. The method of claim 25, wherein said modifying an appearance and/or a capability of said image includes providing a function or trait for said image that is represented by a form of said accessory item.

28. The method of claim 22, wherein said modifying the characteristic of said character includes modifying a trait of said character.

29. The method of claim 28, wherein said accessory for said first tangible product is symbolic in a manner that anticipates said modifying of said trait.

30. The method of claim 22, wherein said image is animated by the user in said computer activity.

31. The method of claim 30, wherein said modifying the characteristic of said image includes modifying an animation of said image in said computer activity.

32. The method of claim 22, wherein said computer activity is provided by a server and wherein said registering is accomplished over a computer network.

33. A method for providing a computer activity, said method comprising the steps of:
   providing a tangible product with a unique first access code;
   providing an accessory with a unique second access code, wherein said accessory is an accessory to said tangible product;
   registering said tangible product on a server connected to a network using said first access code;
   responsive to registering said tangible product, providing an image in said computer activity, said image substantially resembling said tangible product, wherein said image is provided such that it can be animated in said computer activity based on a command received by said server, wherein said computer activity includes an additional image of another registered product, said additional image animated by another user using an additional user computer via said network and located remotely from said user;
   registering the accessory on said server using said second access code; and
   responsive to registering the accessory, modifying a characteristic of said image in said computer activity.

34. The method of claim 33, wherein said computer activity is a competitive game, and wherein said enhancement provides a competitive advantage for said user animating said image against said additional image in said game.

35. The method of claim 33, wherein said first access code is human readable and wherein said registering includes the step of accepting said first access code via manual entry by the user.

36. A method for providing a computer activity on a computer, said method comprising the steps of:
   registering a first product on a computer, wherein the first product belongs to a first class of products;
   responsive to registering the first product, providing a first item in said computer activity;
   registering a second product on said computer, wherein the second product belongs to a second class of products different than the first class of products; and
   responsive to registering the second product, enhancing said first item in said computer activity, wherein said enhancing includes providing a second item in said computer activity, where said second item is an accessory to said first item.

37. The method of claim 36, wherein said second product is an accessory to said first product.

38. The method of claim 37, wherein said second item substantially resembles said second product.

39. The method of claim 36, wherein said enhancing includes modifying a trait of said first item in said computer activity.

40. The method of claim 36, wherein said first product is one of an action figure, a doll, or a toy animal, and wherein said second product is an accessory to said first product that is other than any of said action figure, doll, or toy animal.

41. The method of claim 36, wherein said enhancement includes extending use of said item in said computer activity after use of said first item has expired.

42. The method of claim 36, wherein said first class is a class comprised of action figures, and where said second class is a class comprised of accessories to said action figures.

43. The method of claim 42, wherein said second class is a class of weapons for accessorizing said action figures.

44. A method comprising:
  accepting a first access code on a computer system;
  providing a likeness of a three-dimensional figure on the computer system responsive to accepting the first access code on the computer system;
  allowing interaction with said likeness of the three-dimensional figure on the computer system;
  accepting a second access code associated with the likeness of the three-dimensional figure on the computer system, said second access code changing a way that said likeness of the three-dimensional figure on said computer system reacts to said interaction; and
  using an item for representing an indication of the way in which a behavior of the three-dimensional figure is changed by said second access code.

45. A method as in claim 44, further comprising selling the three-dimensional figure; and wherein said first access code is physically associated with said three-dimensional figure.

46. A method as in claim 44, wherein said first access code comprises a series of alphanumerics.

47. A method as in claim 44, wherein said computer system provides an activity and allows said likeness of said three-dimensional figure to access said activity, and said behavior includes a way that said three-dimensional figure accesses said activity.

48. A method as in claim 44, wherein said change of behavior is an attribute that makes the likeness of said three-dimensional figure in the computer system stronger.

49. A method as in claim 48, wherein said item looks like a fist.

50. A method as in claim 44, wherein said change of behavior is an attribute that makes the likeness of said three-dimensional figure in the computer system have improved health.

51. A method as in claim 50, wherein said item looks like a body part.

52. A method as in claim 44, wherein said change of behavior is an attribute that makes the likeness of said three-dimensional figure in the computer system have improved wisdom.

53. A method as in claim 52, wherein said item looks like a book.

54. A method as in claim 44, further comprising an accessory associated with said second access code, said accessory having a tangible three-dimensional form.

55. A method as in claim 54, wherein said accessory has a packaging, and said second access code is associated with packaging for the accessory.

56. A method as in claim 55, wherein said accessory is a badge.

57. A method as in claim 55, wherein said accessory is a medallion.

58. A method as in claim 44, wherein said second access code extends an expiration date of said first access code.

59. A method comprising:
  accepting a first alphanumeric access code;
  taking an action based on said first alphanumeric access code, said action having an expiration;
  responsive to receiving said first alphanumeric access code and prior to said expiration, providing a likeness of a three-dimensional figure, on a computer system;
  allowing interaction with said likeness of the three-dimensional figure on the computer system prior to said expiration and preventing said interaction after said expiration; and
  accepting a second alphanumeric access code associated with the three-dimensional figure, and extending said expiration based on said second alphanumeric access code.

60. A method as in claim 59, further comprising selling the three-dimensional figure physically associated with said first alphanumeric access code.

61. A system as in claim 59, further comprising selling an accessory for the three-dimensional figure, said accessory physically associated with said second alphanumeric access code, wherein said computer system also provides information indicative of said accessory associated with said likeness of said three-dimensional figure responsive to entry of said second alphanumeric access code.

62. A method for providing a computer activity to a user, said method comprising the steps of:
  providing content for displaying a character in the computer activity;
  registering a tangible accessory item in response to an access code being entered on a computer, the access code being associated with the tangible accessory item; and
  responsive to registering the tangible accessory item, providing content for displaying a visual representation of the tangible accessory item in the computer activity;
  wherein the visual representation of the tangible accessory item is stored in association with the character and allows use of said information indicative of said tangible accessory item at a time subsequent to a time when said access code is entered in the computer activity.

63. A method according to claim 62, wherein the tangible accessory item includes equipment.

64. A method according to claim 62, wherein the tangible accessory item includes clothing.

65. A method according to claim 62, wherein the visual representation of the tangible accessory item is worn or held by the character in the computer activity.

66. A method according to claim 62, wherein the tangible accessory item enhances the character.

67. A method according to claim 62, wherein the tangible accessory item modifies the character.

68. A method according to claim 62, wherein the tangible accessory item modifies an ability of the character.

69. A method according to claim 62, wherein the tangible accessory item grants an ability to the character.

70. A method according to claim 62, wherein the tangible accessory item grants a fighting ability to the character.

71. A method according to claim 62, wherein the tangible accessory item bolsters a chance of success of the character.

72. A method for providing a computer activity on a computer, said method comprising the steps of:
  registering a first product on a computer, wherein the first product belongs to a first class of products;
  responsive to registering the first product, providing a first item in said computer activity;
  registering a second product on said computer, wherein the second product belongs to a second class of products different than the first class of products; and
  responsive to registering the second product, enhancing said first item in said computer activity, wherein said enhancement includes extending use of said item in said computer activity after use of said first item has expired.

73. The method of claim 72, wherein said second item substantially resembles said second product.

74. The method of claim 72, wherein said first product is one of an action figure, a doll, or a toy animal, and wherein said second product is an accessory to said first product that is other than any of said action figure, doll, or toy animal.

75. The method of claim 72, wherein said second class is a class of weapons for accessorizing said action figures.

\* \* \* \* \*

UNITED STATES PATENT AND TRADEMARK OFFICE
CERTIFICATE OF CORRECTION

| | | |
|---|---|---|
| PATENT NO. | : 8,636,588 B2 | Page 1 of 1 |
| APPLICATION NO. | : 12/257496 | |
| DATED | : January 28, 2014 | |
| INVENTOR(S) | : Michael D. Borge | |

It is certified that error appears in the above-identified patent and that said Letters Patent is hereby corrected as shown below:

In the Claims:

Column 7, number 22 should read --The method of claim 4, wherein said first product and said accessory are each a tangible product, and said information accepted is manually input by the user into the computer.--

Signed and Sealed this
Twenty-fourth Day of June, 2014

Michelle K. Lee
*Deputy Director of the United States Patent and Trademark Office*